Figure 1:
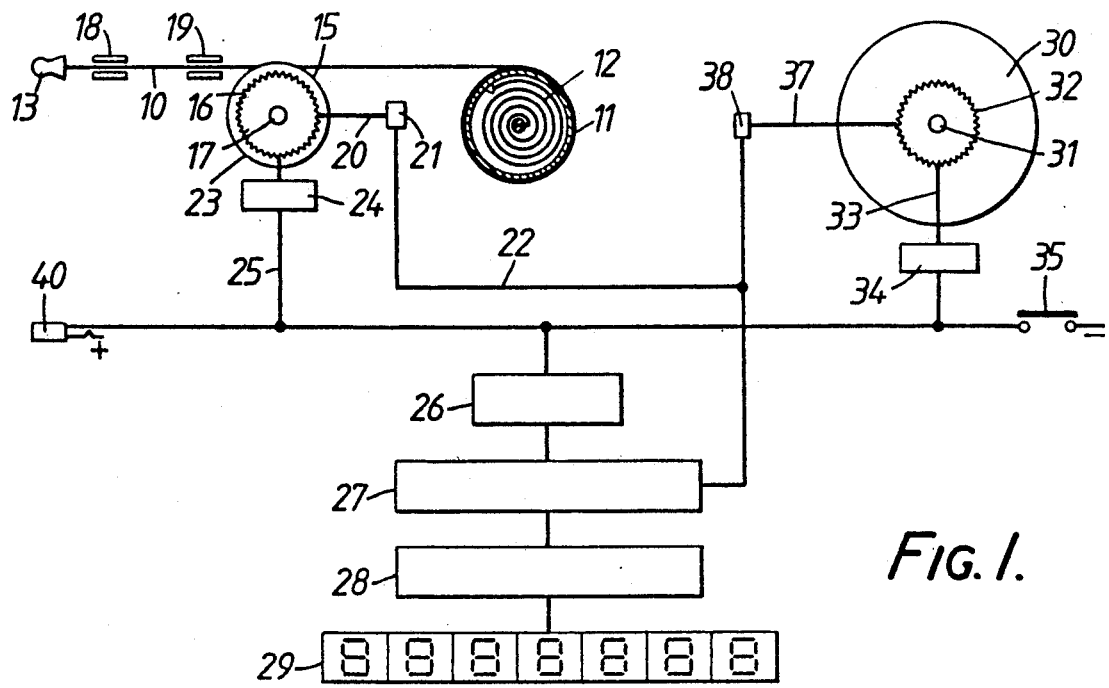

United States Patent [19]
Care

[11] Patent Number: 5,035,064
[45] Date of Patent: Jul. 30, 1991

[54] LINEAR MEASURING DEVICES

[76] Inventor: Ronald J. Care, 15 Llandaff Road, Beufort, Ebbw Vale, Gwent, United Kingdom

[21] Appl. No.: 162,392
[22] PCT Filed: Jul. 20, 1987
[86] PCT No.: PCT/GB87/00511
§ 371 Date: Mar. 8, 1988
§ 102(e) Date: Mar. 8, 1988
[87] PCT Pub. No.: WO88/00776
PCT Pub. Date: Jan. 28, 1988

[30] Foreign Application Priority Data

Jul. 19, 1986 [GB] United Kingdom ............... 8617700
Nov. 15, 1986 [GB] United Kingdom ............... 8627359

[51] Int. Cl.$^5$ ............................ G01B 3/10; G01B 3/12
[52] U.S. Cl. ............................................ 33/760; 33/775; 33/763; 33/773; 33/780
[58] Field of Search ............... 33/138, 139, 140, 141 R, 33/141 E, 141.5, 142, 780, 781, 782, 760, 762, 763, 734, 735, 736, 772, 773, 759, 775

[56] References Cited

U.S. PATENT DOCUMENTS

| | | | |
|---|---|---|---|
| 2,706,336 | 4/1955 | Gruber | 33/139 X |
| 4,164,816 | 8/1979 | Bergkuist | 33/139 |
| 4,181,960 | 1/1980 | Tateishi | 33/140 X |
| 4,185,390 | 1/1980 | Tateishi | 33/139 |
| 4,195,348 | 3/1980 | Kakotani | 33/140 X |
| 4,316,081 | 2/1982 | Washizuka | 33/139 X |
| 4,377,850 | 3/1983 | Simpson | 33/773 X |
| 4,437,241 | 3/1984 | Lemelson | 33/166 |
| 4,551,847 | 11/1985 | Caldwell | 33/137 R X |
| 4,575,944 | 3/1986 | Lin | 33/139 X |
| 4,765,063 | 8/1988 | Sing | 33/763 X |

FOREIGN PATENT DOCUMENTS

| | | | |
|---|---|---|---|
| 2751620 | 5/1978 | Fed. Rep. of Germany | 33/141 R |
| 0036726 | 3/1980 | Japan | 33/141 R |
| 0096207 | 8/1981 | Japan | 33/139 |
| 0235009 | 11/1985 | Japan | 33/140 |
| 1146536 | 3/1985 | U.S.S.R. | 33/138 |
| 2102121 | 1/1983 | United Kingdom | 33/142 |

Primary Examiner—Harry N. Haroian
Attorney, Agent, or Firm—Young & Thompson

[57] ABSTRACT

A measuring instrument comprises a portable case (45) housing a drum (11) on which is wound a flexible mesuring line or tape (10) which runs over a rotary capstan (15) provided with teeth (16) engaged by a sensor (24) acting as a pulse generator to an electronic counter (27). In addition there is a direction sensor (21) arranged to provide a count-up or count-down signal and a further direct measuring wheel (30) as teeth (32) acting as a pulse generator to the same counter (27).

5 Claims, 4 Drawing Sheets

LINEAR MEASURING DEVICES

This invention relates to linear measuring devices as used for example for measuring dimensions of rooms, buildings, or other objects, or for measuring the distance travelled along a surface. The term 'linear' is intended also to include measurement of distances along non-straight paths or over non-flat surfaces.

So-called "tape measures" are well-known, consisting of a length of tape along which are marked the units of measurement, (e.g. centimeters or inches), the tape being wound on a rotary reel provided with rewind facilities. Such tape measures have certain limitations, for example only a limited length of tape can be stored on a reel, the tape cannot easily be read in the dark, or by the blind, and it may become dirty or be damaged.

Wheel measuring devices have also been proposed in which the wheel is run along the surface to be measured and the motion of the wheel operates a counter or display which represents units of measurement. These wheel measuring devices, are only applicable to certain specific uses and are subject to certain operating difficulties.

It is an object of the invention accordingly to provide an improved measuring device which will overcome some of the problems experienced with existing instruments.

Broadly stated the invention consists in a linear measuring device comprising a holder, a movable measuring element, a sensor for detecting movements of the measuring element, an electrical pulse generator coupled to the sensor, and electronic digital counter or calculator circuit connected to the pulse generator, and an output circuit connected to a visible or audible or recording output unit.

According to a preferred feature of the invention the sensing means includes a pulse generator sensitive to the movements of the element, and an electronic counter or calculator circuit connected to the pulse generator. In some forms of the invention the sensing means includes a rotary element engaging the measuring element so as to be turned by linear movement thereof, and arranged to generate pulses accordingly. Also the measuring element is elongate and has physical, mechanical, magnetic or optical linear measuring points, and the sensing means includes a detector capable of sensing such measuring points.

According to another preferred feature of the invention the measuring element is movable in one direction for measuring purposes, and includes means for shifting the measuring element in the opposite direction into a starting position.

In some forms of the invention the measuring element may be a rigid extendable member, this being particularly useful for measuring small dimensions. In other forms of the invention the measuring element is a long thin flexible line, tape or the like, wound in a coil or drum. Conveniently, it may be in the form of a fine thread. This is the most economical form and permits the maximum length to be contained on a drum of given dimensions.

Preferably the device also includes a spring, or motor-driven or manual rewind mechanism for the coil or drum.

Alternatively or in addition to the measuring element referred to, it may be in the form of a direct rotary measuring device comprising a rotor with at least part of its periphery exposed. This allows the device to measure uneven or non-linear surfaces or dimensions and it may, for example, be used to measure the internal circumference of a drum.

For a number of purposes such as use by the blind it is of advantage that the device should include an audible signalling device to provide audible information on the movement of the measuring element. Furthermore, the device may also include means for converting the display from imperial to metric or other units.

It is also of advantage to include means for connection to an external remote signal generator The device may also be incorporated with a height-measuring system operating on the "vertical sextant angle" principle. Thus the device may include a vertical angle measuring device and a calculator programmed to combine the tangent of the measured angle with the sensed linear measurement to provide a measure of the vertical height of an object. To establish the vertical datum there may be a bubble level, pendulum or the like. The device preferably includes means for totalling the movement of the measuring element in one direction, and for subtracting measured movements in the opposite direction and it may also include means for setting and/or adjusting the datum or zero of the sensed measurement.

In a particular preferred form of the invention the device includes means for attaching the holder to a tool such as an electric power drill, saw or moulder, with the measuring element engaging the workpiece so as to indicate the depth of 'cut' made by the tool.

Figure 2A:
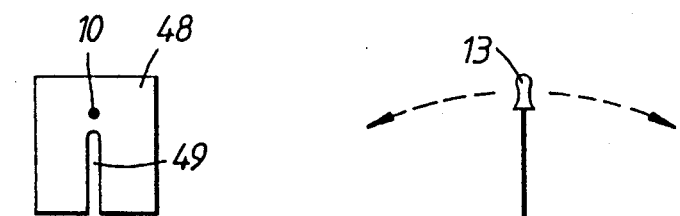
Figure 2:
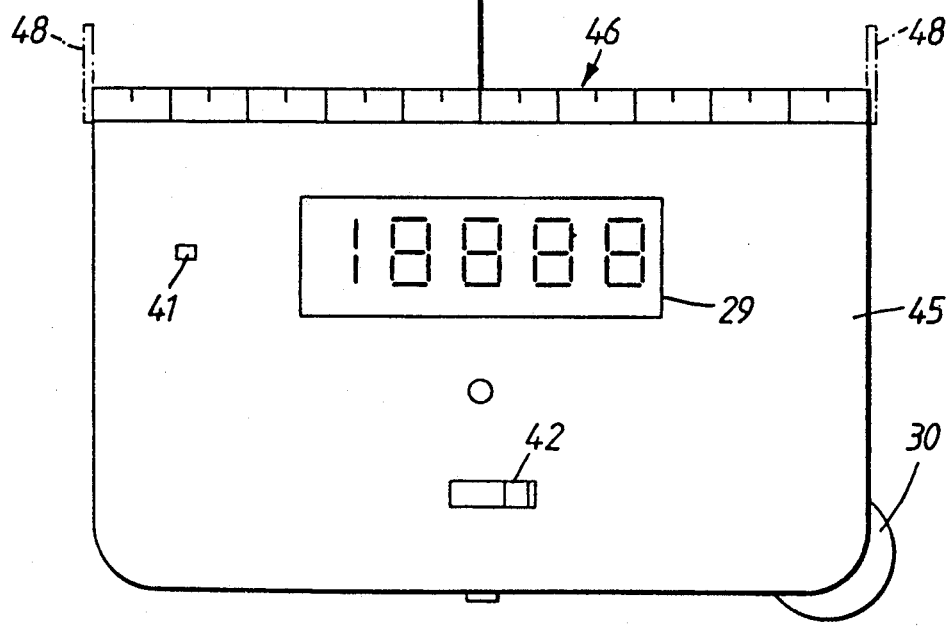

The invention may be performed in various ways and several preferred embodiments will now be described, by way of example, with reference to the accompanying drawings, in which:

FIG. 1 is a diagram illustrating the main mechanical and electrical components of one embodiment of the invention, FIG. 2 is an external view of this same example.

Figure 3:
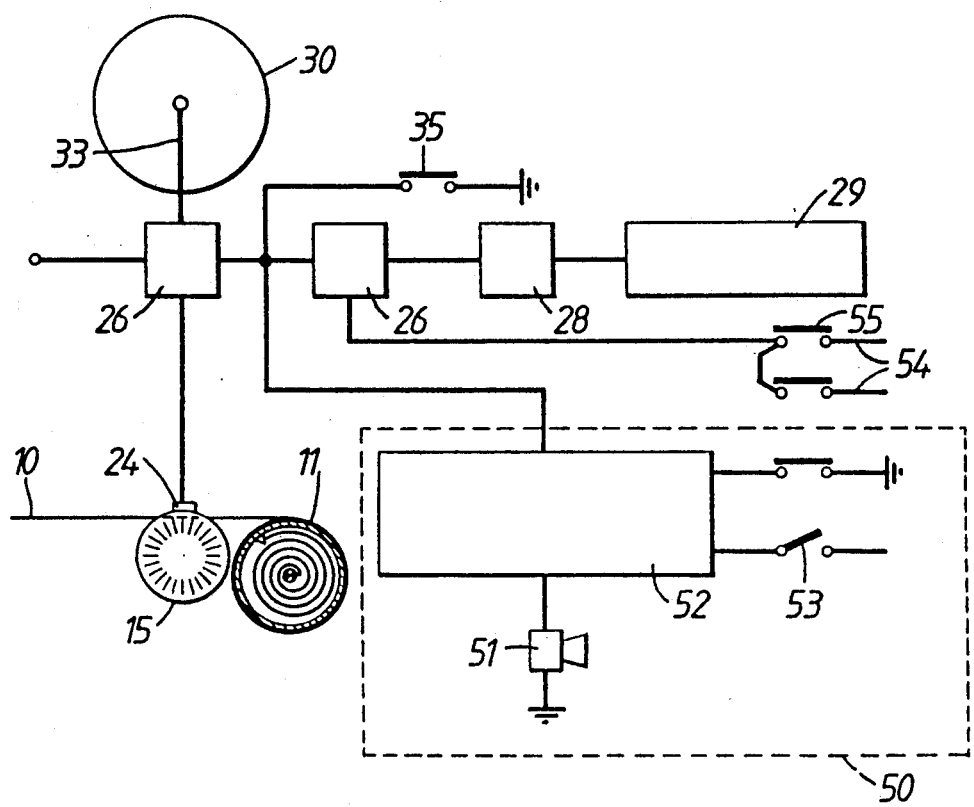
Figure 4:
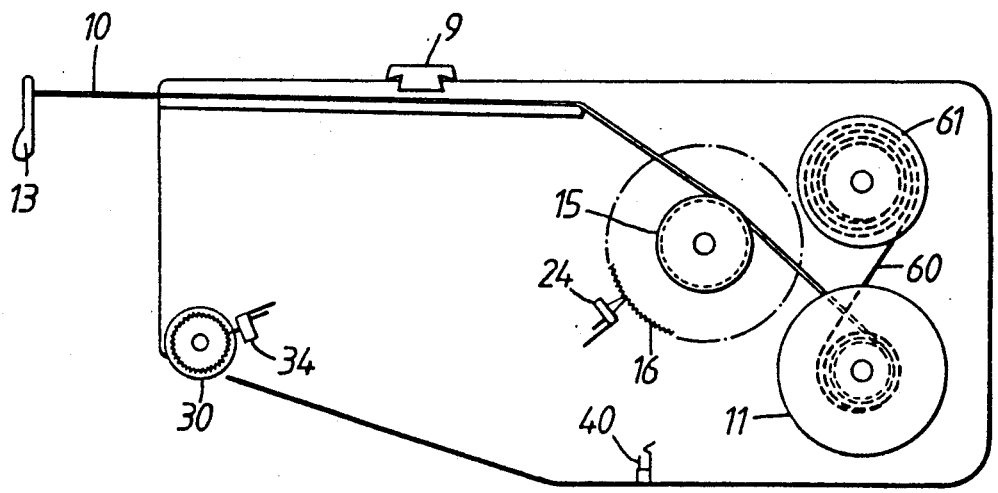
Figure 5:
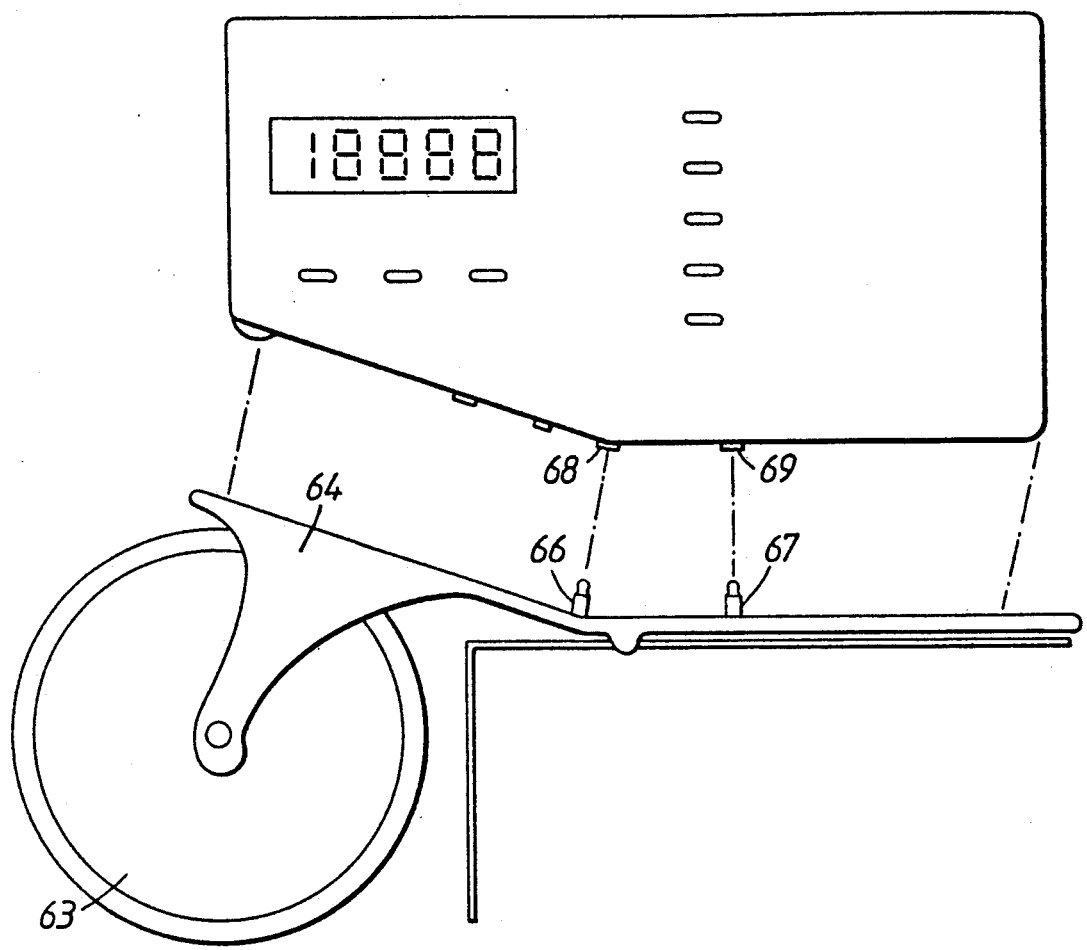
Figure 6:
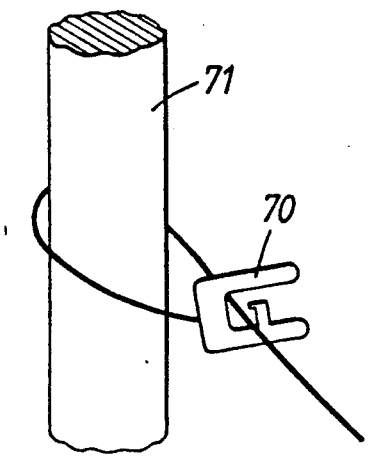
Figure 7:
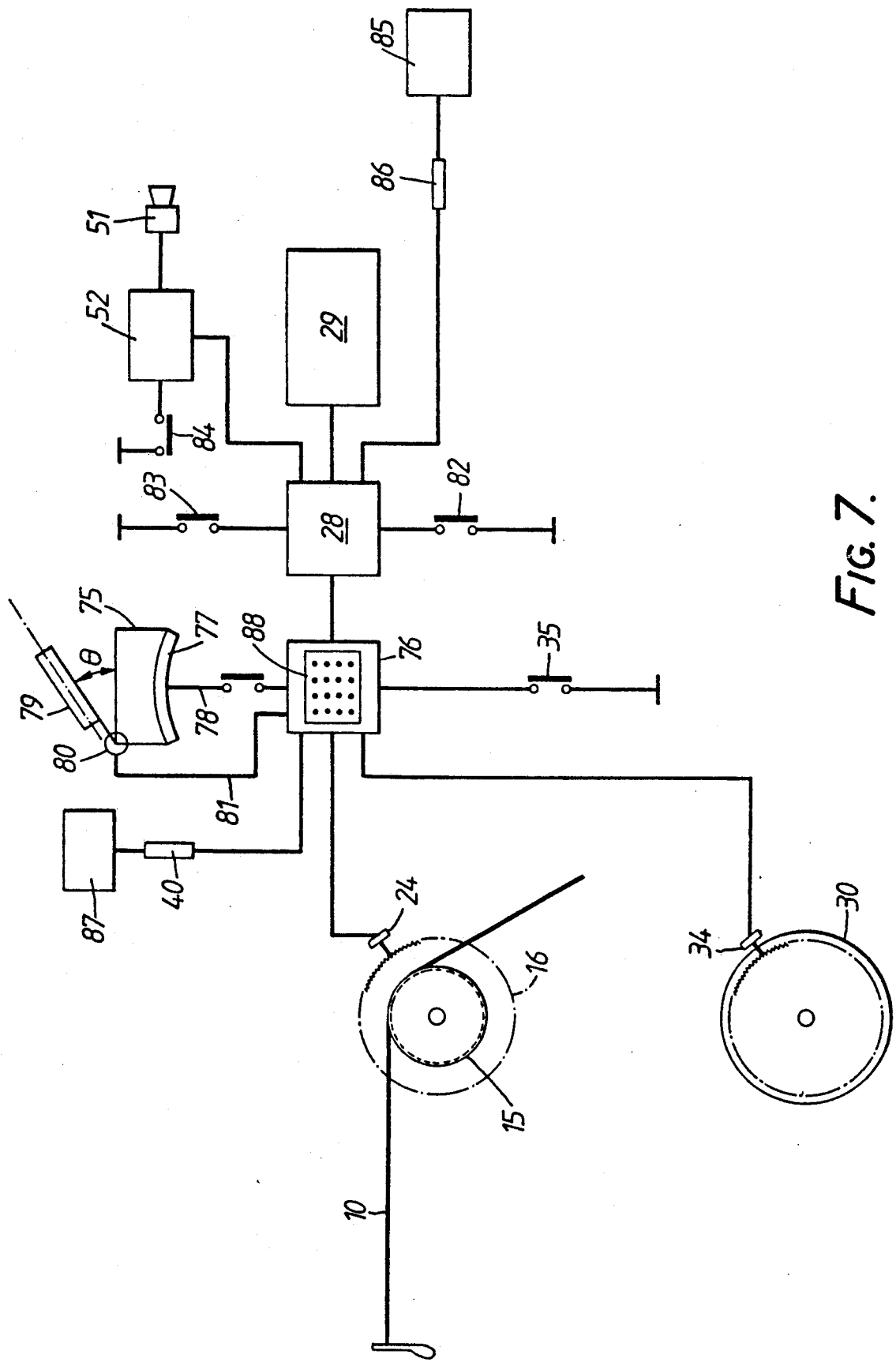

FIG. 2A is an end view of an enlarged scale illustrating the clip at the end of the measuring line, FIG. 3 is a block circuit diagram illustrating the main electrical components of another embodiment, FIG. 4 is a sectional elevation through another embodiment of the invention illustrating the main mechanical components, FIG. 5 is an external view of another embodiment illustrating an auxiliary measuring wheel, FIG. 6 is a perspective view illustrating a modified clip at the end of the measuring line, and FIG. 7 is a block circuit diagram illustrating the main electrical and mechanical components in another example of the invention.

Referring first to FIG. 1 the measuring apparatus in this example comprises a flexible line 10 wound on a drum 11 provided with an automatic rewind spring 12 and having a clip or other fitting 13 at its free end. The line may be formed of any suitable flexible non-extensible, rotproof, material such as nylon, steel, or synthetic plastics. The line in this example is preferably a circular section monofilament and it is wound around a friction pulley or capstan 15 having a shallow external groove with which the line makes a good frictional grip. This capstan is formed with a number of closely spaced teeth or notches 16 at intervals corresponding to the smallest unit of measurement required for the measuring line. For example, if the smallest required unit of measurement is 0.5 m.m. the teeth will be spaced at the appropriate angle measured from the rotary axis 17 to give a circumferential measurement of 0.5 mm at the periphery of the groove between adjacent tooth positions.

The apparatus also includes a first detector comprising a feeler 23 positioned to engage the teeth 16 as the capstan rotates and to influence a sensor 24 which may, for example, be a piezo electric crystal or a microswitch, the output from the sensor being fed on line 25 to the digital counter circuit to be described. The apparatus also includes a further directional sensor comprising another finger 20 also arranged to engage the notches 16 and connected to a sensor 21 which may take a variety of forms but produces an output signal on line 22 which provides an indication of either forward or reverse movement of the capstan 15. This directional sensor may, for example, be an electronic filter circuit coupled with a piezo electric crystal designed to detect the shape of the pulses generated by the crystal in response to movements of the feeler 20. Alternatively the two sensor 21, 24 may be coupled with circuitry designed to produce a directional signal in response to the phase difference or phase change between the two feelers.

The electronic digital counter includes a "de-bouncing unit" 26, including filter circuitry to eliminate unwanted or unintensional pulses, a binary coded decimal counter 27, and a binary coded decimal de-coder 28 linked with a seven segment LCD display 29 arranged to display the measured increments in decimal form, in this case in meters, centimeters and millimeters.

When the line is rewound on to the drum 11 by the spring 12 the sensor 21 detects the reverse rotation of the capstan wheel 15 and provides a pulse on line 22 to the counter 27 to indicate that the pulses are to be subtracted thereby providing a countdown towards zero. At any instant the resultant measurement from the counter 27 may be held on the display 29 or in an electronic memory by pressing a button 35, which prevents further pulses reaching the counter 27 and holds the last reading on the display 29. When switched off the device is automatically reset to zero.

The apparatus also includes a direct wheel measuring facility comprising an exposed rotor wheel 30 mounted to rotate on an axis 31 and having a rotary pulse generator including a toothed rotor 32 engaged by a feeler 33 attached to a piezo electric or other electric pulse generator 34. The output from this pulse generator is fed to the de-bouncing unit 26 and to the other components of the counter already described. In addition there is a further feeler 37 connected to a sensor 38 providing an electric signal signifying forward or reverse movement of the wheel 30. This component of the instrument operates in somewhat the same manner as the flexible line measuring device, but the measuring pulses are generated by running the wheel 30 along a surface whose measurements are required.

In addition this instrument includes an auxiliary input 40 in the form of an electrical socket intended to cooperate with an auxiliary jack attached to an external pulse generator such as a pedometer, or manual or foot operated switch. These pulses will be added and displayed in the unit 29 as previously described.

In the instrument illustrated in FIG. 2 and FIG. 2A the case 45 has a centimeter scale 46 along one edge with the flexible measuring line 10 issuing through a hole at the centre, the line having a flat clip or plate 48 at its free end with a slot 49 which allows the clip to be temporarily held at the end of the scale when required, or alternatively to allow the line to be temporarily anchored round any suitable fixed object such as a hook or pole. In this example the external direct measurement wheel 30 is located at one corner of the case, the LCD display unit 29 is located centrally, the auxiliary input 40 on the opposite edge of the case and, in addition, there is a switch or button 41 controlling a metric to imperial conversion circuit, and a mode selector switch 42.

In the alternative embodiment illustrated in FIG. 3 like parts are indicated by the same reference numerals. This unit includes an additional audible unit indicated generally at 50, which includes a loudspeaker 51 connected to a tone generator 52 combined with counter and register store. In addition there is an audio on/off switch 53 and an external audio line 54 operated by switch 55.

In the example illustrated in FIG. 4 again the main components are indicated by the same reference numerals as in FIG. 1 and in this case the rewind drum 11 is connected to a "Tensator" (RTM) spring 60 whose opposite ends are wound around the rewind drum 11 and the spring housing drum 61. This provides a substantially constant rewind force over the whole length of the measuring line. The other components in this illustrated example are similar to those of FIG. 1.

In the further example illustrated in FIG. 5 the direct measuring wheel 30 of the FIG. 1 example is replaced by a detachable measuring wheel 63 of larger diameter mounted on a fitting or bracket 64, which is designed to clip on to the body or housing 65 of the instrument and is provided with electrical contacts 66, 67 to engage corresponding contacts 68, 69 on the body of the housing so that the impulses generated by the wheel are fed to the counter and display unit in the same manner as previously described.

FIG. 6 illustrates a modified form of clip 70 at the end of the measuring line 10 intended to facilitate fastening of the line around a fixed pole or hook 71.

A further example illustrated in FIG. 7 contains components similar to those of the FIG. 1 example and indicated by the same reference numerals. In addition, this example includes a sextant and bubble level unit 75 linked to the first calculator unit 76. The mercury "bubble gauge" 77 has an output 78 providing an indication when the instrument is held level. The sight tube 79 is coupled to an angle meter 80 providing a pulsed output on line 81 which is a measure of tan $\theta$ where $\theta$ is the angle of elevation of the sight tube. When combined with the measurement signal D generated by the pulse generator 21 from the measuring line 10, the calculator 76 provides an output equivalent to D tan $\theta$, i.e. the height of the object being observed.

In the FIG. 7 example 87 is an external pulse generator such as a foot switch, connected via jack 40 to the calculator, 82 is the metric/imperial conversion switch, 83 is the zero or reset datum switch, 84 is a manual on-off switch for the tone generator/synthesiser 52, and 85 is an external printer connected to the counter circuit through the jack 86. The calculator 76 includes a decimal keyboard 88 by which programmed mathematical functions or further numerals may be introduced.

It will be appreciated that the line or tape 10 may in use accummulate dirt or in other ways suffer an increase or change in thickness, and this may affect the accuracy of the measurements made by the rotary capstan 15 and sensor device 16, 24. To eliminate or compensate for this the device preferably includes a cleaning element 18 in the form of a felt or fibre wiper and an electrical thickness sensor or gauge 19 which continually senses the dimensions of the element 10, and applies a corresponding correction as a negative percentage factor to the counter 27, the correction being proportional to the sensed change in dimensions. Alternatively or in addition the gauge 19 may be connected to an electrical warning device, such as a flashing light or audible alarm, to indicate that the element 10 needs to be cleaned, and that the measurements are suspect.

In the embodiment of FIG. 3 the audible unit 50 with the loudspeaker 51 may take various different forms. For example, the tone generator may be linked to the counter circuit to produce a series of tones or "bleeps" equivalent in number to the digits which would be displayed visibly, for the assistance of the blind, or in the dark for example. Alternatively or in addition to the tone generator there may be a speech synthesiser also linked to the counter/calculator unit and arranged to generate speech sounds representing the digits in the display unit. The calculator preferably includes an electronic memory which may, for example, be of the magnetic or diode type and the calculator preferably includes at least the basic mathematical functions of a portable hand-held instrument, i.e., $+$, $-$, $\times$ and $\div$. Thus, for example, it is possible to take a first measurement a which will be held in the memory to be followed by a second linear measurement b also held in the memory, so that the operator can selectively either add $a+b$, or multiply $a \times b$ to produce an area. Likewise, the volume of a room or tank having side a, b, c, can be obtained by three successive measurements a, b, c, combined by a double multiplying fuction. Likewise, simple mathematical calculations can be performed with simple inbuilt or programable functions; for example, the radius of a cylinder R can be obtained from a measurement Q of its circumference using the programmed function $R = Q/2\pi$ Conveniently the calculator unit is coupled to the counter so that the measured values can be entered directly in the calculator. Alternatively, however, the calculator may be a separate unit in the same holder having manual binary decimal input keys. The operator then enters the measured values into the calculator as in a normal independant calculator unit. The sextant-bubble level unit 75 may have a fixed sextant angly $\theta$ if preferred, in which case the calculator may have a pre-programed $\tan \theta$ value to obtain the height h of the observed object directly from the formula $h = d \tan \theta$, where d is the measured distance from the object.

The output from the counter may, if required, be connected to an internal or external printer to provide a permanent record of the measured or calculated values. The instrument may also include mechanical and/or electronic "hold" or locking devices to retain the instantaneous position of the capstan or measuring wheel or to maintain the sensed measurement in the electronic memory. The direct measuring wheel may, if required, be provided with an adjustable zero/datum index to facilitate direct measurements and to afford an adjustable set zero. The control buttons on the casing of the instrument may be recessed and they may be combined with an electronic bleeper circuit to provide an audible indication when any button is actuated.

I claim:

1. A measuring device comprising a holder, a movable measuring element normally housed partly within the holder, a sensor for detecting movements of the measuring element and an electrical pulse generator coupled to the sensor, an additional rotary measuring element exposed externally of the holder and a sensor for detecting movements of the external rotary measuring element, an electronic digital counter circuit connected to each pulse generator, switch means for selectively connecting said counter circuit to a selected one of said pulse generators, and an output circuit connected to the counter circuit.

2. A linear measuring device comprising a holder, a winding drum, an extendable flexible measuring element wound on the drum, a rotary pulley engaging the element for rotational movement in response to linear movement of the element, means for sensing rotary movements of the pulley, a pulse generator operated thereby, an electronic digital counter having an input connected to the pulse generator, and an output to a display output unit, a second direct measuring device including an exposed wheel, and a pulse generator associated therewith, and having an output to the same digital counter circuit, and switch means for selectively connecting said counter circuit with a selected one of said pulse generators.

3. A linear measuring device comprising a holder, a flexible elongated thin measuring line, a reel for holding multiple turns of said line and means for rotating the reel to recoil said line thereon, a rotary sensor engaging said line, for detecting movements of said line, an electrical pulse generator coupled to said sensor, means for detecting the direction of movement of said line, an electronic digital counter circuit connected to said pulse generator and to said direction sensor to provide an up/down count, means for retaining the value of the count in storage, an output unit, and an output circuit connected to said counter circuit and to said output unit, and further including an additional direct rotary measuring device comprising a rotor with at least part of its periphery exposed, a sensor for detecting movements thereof, a pulse generator coupled to the sensor and having an output to said counter circuit and switch means for selectively connecting said counter circuit with a selected one of said pulse generators.

4. A linear measuring device comprising a holder, a flexible elongated thin measuring line, a reel for holding multiple turns of said line and means for rotating the reel to recoil said line thereon, a rotary sensor engaging said line, for detecting movements of said line, an electrical pulse generator coupled to said sensor, means for detecting the direction of movement of said line, an electronic digital counter circuit connected to said pulse generator and to said direction sensor to provide an up/down count, means for retaining the value of the count in storage, an output unit, and an output circuit connected to said counter circuit and to said output unit and further including a vertical angle measuring device comprising an angularly adjustable sighting element, an angle sensor for measuring the adjusted angle thereof arranged to generate a corresponding electrical signal, said sensor being electrically connected to said calculator circuit and in which the calculator is programmed to combine the tangent of the angle with the sensed linear measurement to provide a measure of the vertical height of a sighted object.

5. A measuring device according to claim 4, including an artificial horizon device to provide a datum for the angle.

* * * * *